US011349137B2

(12) United States Patent
Horiuchi

(10) Patent No.: US 11,349,137 B2
(45) Date of Patent: May 31, 2022

(54) HUMIDIFIER

(71) Applicant: HONDA MOTOR CO., LTD., Tokyo (JP)

(72) Inventor: Yuhei Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 16/518,456

(22) Filed: Jul. 22, 2019

(65) Prior Publication Data

US 2020/0036016 A1   Jan. 30, 2020

(30) Foreign Application Priority Data

Jul. 24, 2018   (JP) .............................. JP2018-138367

(51) Int. Cl.
*H01M 8/04119*   (2016.01)
*H01M 8/04828*   (2016.01)
*B01D 63/06*   (2006.01)

(52) U.S. Cl.
CPC ... *H01M 8/04149* (2013.01); *H01M 8/04141* (2013.01); *H01M 8/04835* (2013.01); *B01D 63/06* (2013.01); *H01M 8/04126* (2013.01); *H01M 8/04828* (2013.01); *H01M 8/04843* (2013.01); *H01M 2250/20* (2013.01)

(58) Field of Classification Search
CPC ......... H01M 8/04149; H01M 8/04835; H01M 8/04141; H01M 8/04843; H01M 8/04828; H01M 8/04126; H01M 8/0412; F24F 2003/1435

See application file for complete search history.

(56) References Cited

U.S. PATENT DOCUMENTS

| 8,414,693 | B2 | 4/2013 | Takagi |
| 9,303,600 | B2 | 4/2016 | Kato |
| 2005/0116365 | A1* | 6/2005 | Yazawa ............. H01M 8/04126 261/104 |
| 2007/0051913 | A1 | 3/2007 | Torii et al. |

(Continued)

FOREIGN PATENT DOCUMENTS

| JP | H11-257835 A | 9/1999 |
| JP | 2004-160407 A | 6/2004 |
| JP | 2007-064176 A | 3/2007 |

(Continued)

OTHER PUBLICATIONS

Office Action dated Sep. 14, 2021 issued over the corresponding Japanese Patent Application No. 2018-138367 with the English translation thereof.

(Continued)

*Primary Examiner* — Matthew W Van Oudenaren
(74) *Attorney, Agent, or Firm* — Carrier Blackman & Associates, P.C.; William D. Blackman; Joseph P. Carrier

(57) ABSTRACT

In a humidifier in which an inlet head and an outlet head are connected to one end and another end of a cylindrical housing of a humidifying module, a humidified-fluid inlet joint is connected to the inlet head via a first joint connection, and a fluid-to-be-humidified outlet joint is connected to the outlet head via a second joint connection, clearances that are capable of adjusting connecting positions in directions of the connecting surfaces are provided on the joint connections as well as on connections between the housing and the inlet head and the outlet head.

5 Claims, 5 Drawing Sheets

(56) References Cited

U.S. PATENT DOCUMENTS

2008/0237902 A1* 10/2008 Nagumo ............... B01D 53/22
                                                   261/104
2009/0039010 A1*  2/2009 Hayashi ............... B01D 63/02
                                                   210/321.8

FOREIGN PATENT DOCUMENTS

| JP | 2009-208013 A | 9/2009 |
| JP | 2009-286240 A | 12/2009 |
| JP | 2010-107099 A | 5/2010 |
| JP | 2011-143347 A | 7/2011 |
| JP | 2014-077401 A | 5/2014 |

OTHER PUBLICATIONS

Office Action dated Mar. 1, 2022 issued over the corresponding Japanese Patent Application No. 2018-138367 with the English translation thereof.

* cited by examiner

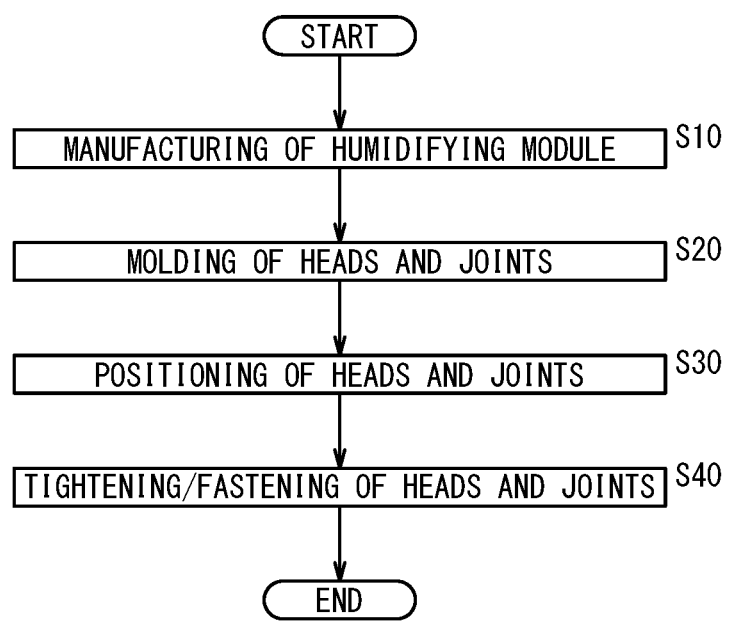

HUMIDIFIER

CROSS-REFERENCE TO RELATED APPLICATION

This application is based upon and claims the benefit of priority from Japanese Patent Application No. 2018-138367 filed on Jul. 24, 2018, the contents of which are incorporated herein by reference.

BACKGROUND OF THE INVENTION

Field of the Invention

The present invention relates to a humidifier in which outlets and inlets for a fluid to be humidified and a humidified fluid are provided.

Description of the Related Art

In Japanese Laid-Open Patent Publication No. 2010-107099, a humidifier is disclosed that carries out exchange of moisture by having different fluids flow between an inner side and an outer side of hollow fiber membranes. The humidifier is equipped respectively with an outlet and an inlet for the fluid to be humidified, and an outlet and an inlet for the humidified fluid. With such a humidifier, joints are provided for respectively connecting a pipe for supplying the fluid to be humidified to the humidifier, a pipe for discharging the fluid to be humidified, a pipe for supplying the humidified fluid, and a pipe for discharging the humidified fluid.

SUMMARY OF THE INVENTION

In the above-described humidifier, high positioning accuracy is required in order to connect the pipes to the joints. However, when a large-scale member such as the housing that constitutes the humidifier is manufactured by integral molding of a resin, a necessary degree of accuracy cannot be obtained, and there is a need to perform additional machining after completion of molding, thus leading to a problem of increased costs.

A humidifier has been desired in which joints with high positional accuracy can be provided while reducing manufacturing costs.

An aspect of the present invention is characterized by a humidifier comprising a humidifying module including a cylindrical housing, an inlet head connected to one end of the housing at a connecting surface perpendicular to an axis of the housing, an outlet head connected to another end of the housing at a connecting surface perpendicular to the axis of the housing, a humidified fluid inlet joint connected to the inlet head via a first joint connection having a connecting surface orthogonal to the connecting surface between the housing and the inlet head, a fluid-to-be-humidified outlet joint connected to the outlet head via a second joint connection having a connecting surface orthogonal to the connecting surface between the housing and the outlet head, and fastening members for respectively fixing a connection between the housing and the inlet head, a connection between the housing and the outlet head, and the first and second joint connections, wherein, on a connection between the housing and the inlet head, a connection between the inlet head and the humidified fluid inlet joint, and a connection between the outlet head and the fluid-to-be-humidified outlet joint, clearances are provided that are capable of adjusting connecting positions in directions of the connecting surfaces of the connections.

In accordance with the humidifier having the above-described aspect, the positions of the joints can be adjusted within a desired range of clearance. Consequently, the positional accuracy required for the joints can be achieved without the need for additional machining to be performed with respect to the housing.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 5 is a flowchart of a method of manufacturing the humidifier shown in FIG. 1.

DESCRIPTION OF THE PREFERRED EMBODIMENTS

Preferred embodiments of the present invention will be presented and described in detail below with reference to the accompanying drawings.

Figure 1:
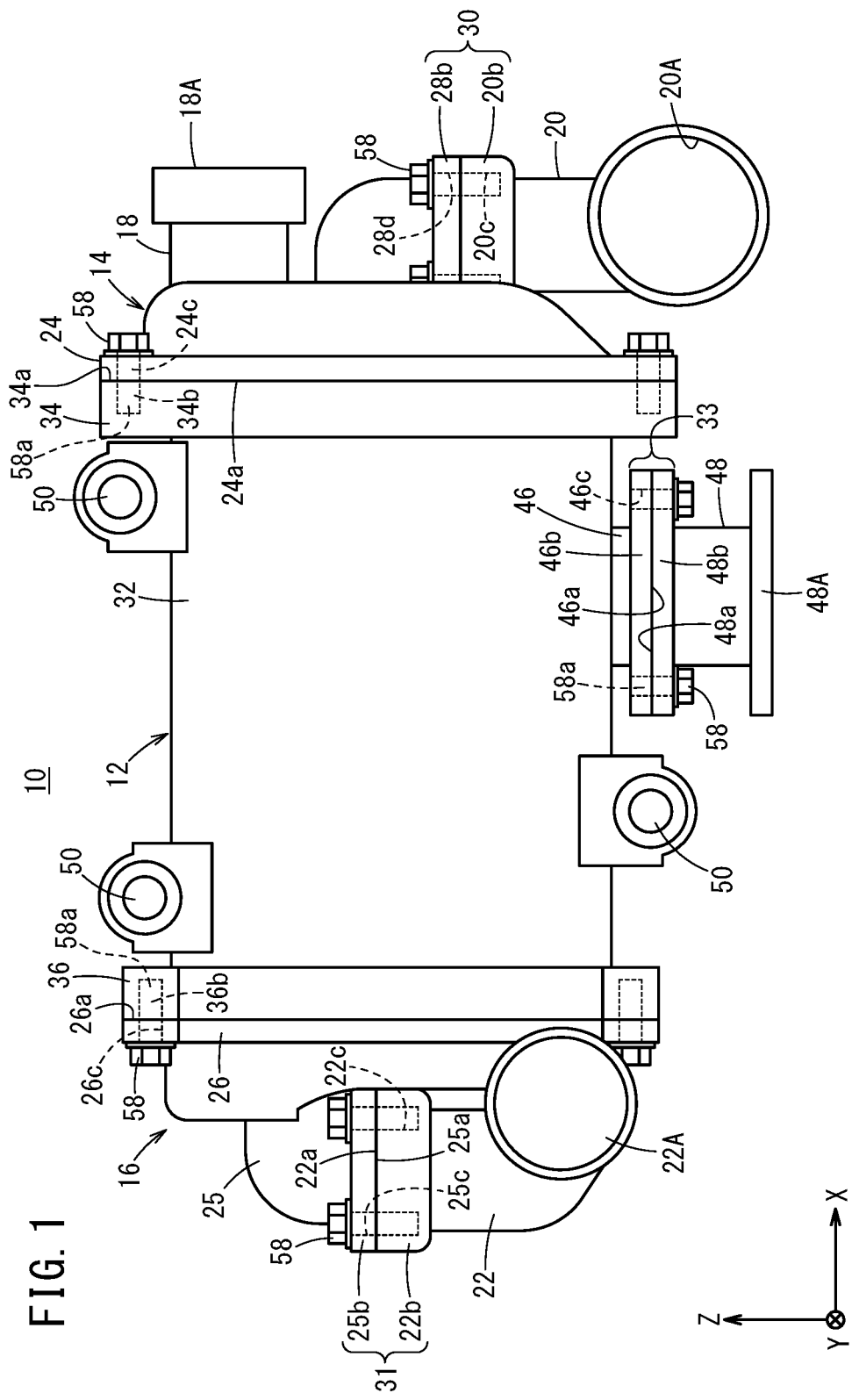
FIG. 1 is a front view of a humidifier according to a first embodiment of the present invention.
Figure 2:
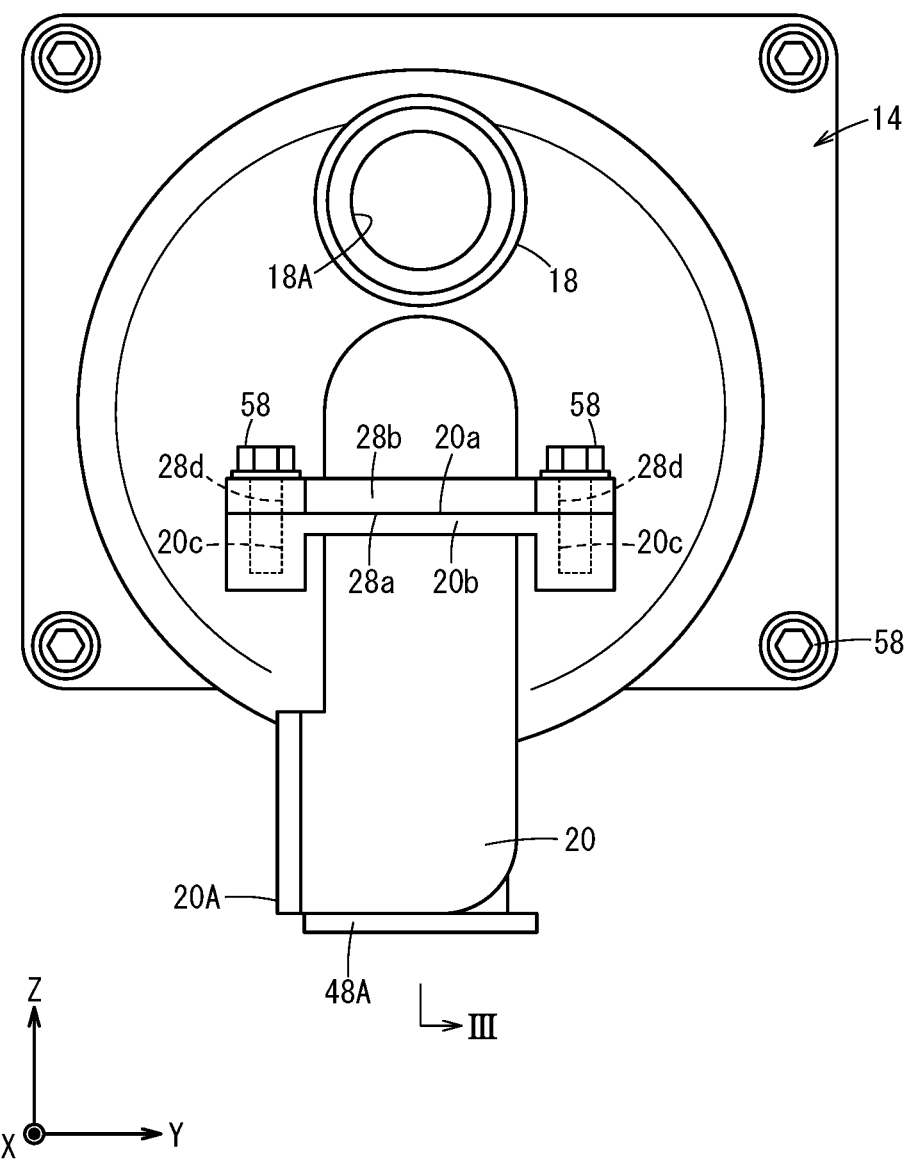
FIG. 2 is a side view of the humidifier shown in FIG. 1.

The humidifier 10 according to the embodiment shown in FIG. 1 is used, for example, in order to humidify a fluid to be humidified (a dry fluid) which is a gas (for example, air or hydrogen) that is supplied to cathodes and anodes of a fuel cell stack, and humidifies the fluid to be humidified using a humidified fluid (a wet fluid) which is an off gas that is discharged from the fuel cell stack and which contains a large amount of water vapor (moisture) therein. The fuel cell stack, for example, is a fuel cell stack for use in a vehicle, and the humidifier 10 is fixed to a frame of the vehicle in which the fuel cell stack is mounted.

The humidifier 10 is equipped with a cylindrical humidifying module 12, an inlet head 14 (first head) connected to one end in the axial direction of the humidifying module 12, an outlet head 16 (second head) connected to another end in the axial direction of the humidifying module 12, a humidified-fluid inlet joint 20 (second inlet joint) connected to the inlet head 14, a fluid-to-be-humidified outlet joint 22 (first exhaust joint) connected to the outlet head 16, and a humidified fluid outlet joint 48 (second exhaust joint) connected to an outer peripheral portion of the humidifying module 12. A fluid-to-be-humidified introduction port 18 (first inlet joint) is provided on the inlet head 14.

Figure 3:
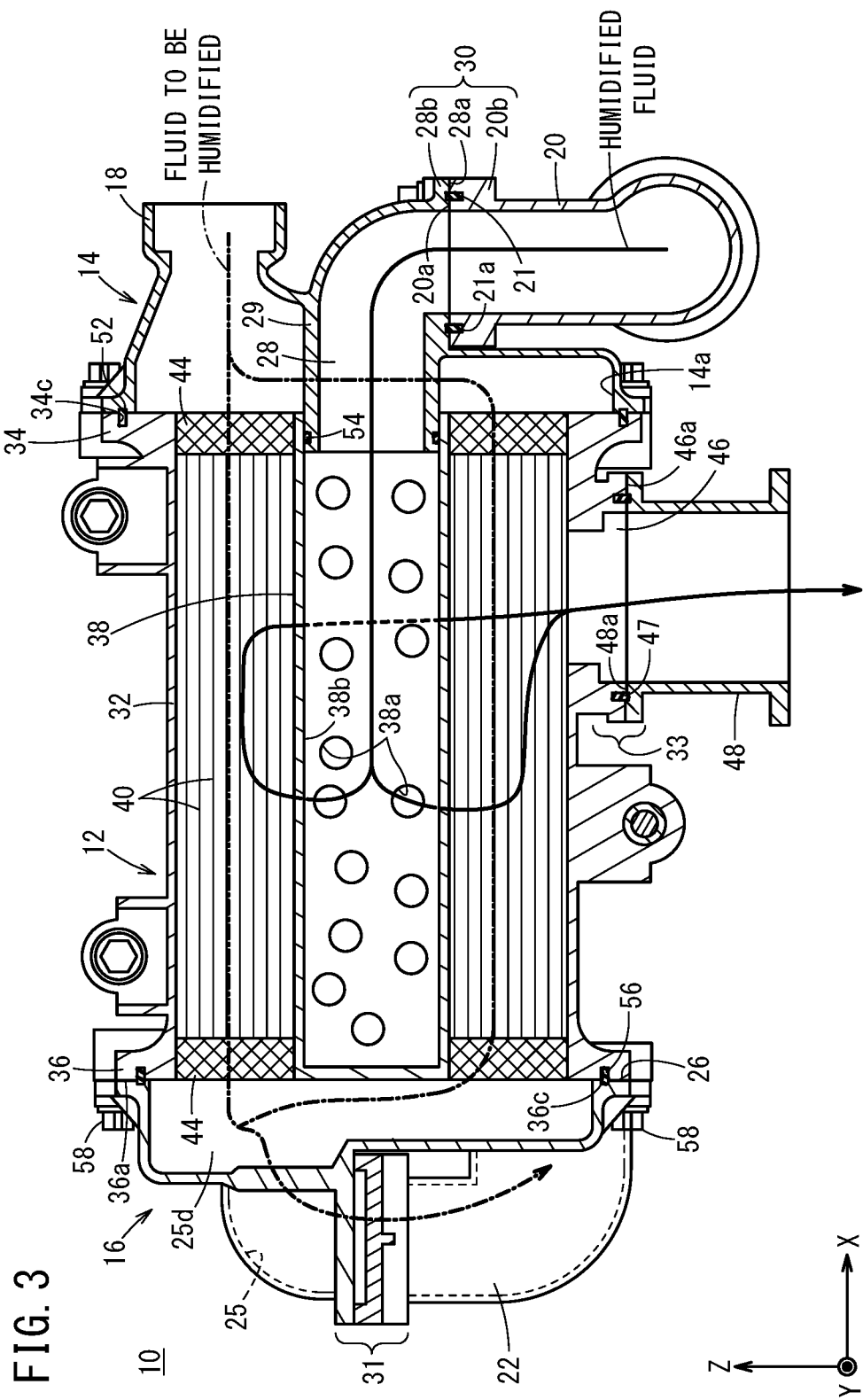
FIG. 3 is a longitudinal cross-sectional view of the humidifier taken along line III-III of FIG. 2.

As shown in FIG. 3, the humidified fluid is introduced into the interior of the humidifying module 12 via the humidified-fluid inlet joint 20. Thereafter, as shown by the solid lines in the figure, the humidified fluid passes between a plurality of hollow fiber membranes 40 of the humidifying module 12, and is discharged from the humidified fluid outlet joint 48 that is connected to the humidifying module 12.

Further, compressed gas (a fluid to be humidified) which is supplied from a compressor or a high pressure tank is introduced into the humidifier 10 from the fluid-to-be-humidified introduction port 18. As shown by the one-dot-dashed line, the fluid to be humidified passes through the interior of the hollow fiber membranes 40, and is discharged from the fluid-to-be-humidified outlet joint 22. By the fluid to be humidified flowing inside the hollow fiber membranes 40 provided in the humidifying module 12, and by the humidified fluid flowing outside the hollow fiber membranes 40, moisture is transferred from the humidified fluid to the fluid to be humidified.

As shown in FIG. 1, by means of fixing members 50, the humidifier 10 is fixed to a member such as a vehicle body frame or the like. Four pipes (not shown) which extend from an external device such as a fuel cell or a compressor or the like are connected respectively to the fluid-to-be-humidified introduction port 18 provided on the inlet head 14, the humidified-fluid inlet joint 20, the fluid-to-be-humidified outlet joint 22, and the humidified fluid outlet joint 48. In order to reliably connect such pipes to the humidifier 10, openings 18A, 20A, 22A, and 48A of the port 18 and the joints 20, 22, and 48 are assembled with high accuracy on the basis of the fixing members 50. Hereinafter, details of the humidifier 10 will be further described.

As shown in FIG. 3, the humidifying module 12 is equipped with a housing 32, the hollow fiber membranes 40, and a humidified fluid introduction pipe 38. The housing 32 is manufactured, for example, by integrally molding a resin, and is formed in a substantially cylindrical shape. The hollow fiber membranes 40 are accommodated inside the housing 32. The hollow fiber membranes 40 extend in the axial direction of the housing 32 (the X direction in FIG. 3), and a plurality of the hollow fiber membranes inside the housing 32, for example, several thousand, are bundled together and accommodated within the housing 32. The inner parts (lumens) of the hollow fiber membranes 40 are in communication with the interior of the inlet head 14 and the interior of the outlet head 16.

The humidified fluid introduction pipe 38 is a tubular member extended in an axial direction in the vicinity of a central axis of the housing 32. A plurality of openings 38a are provided in the circumferential wall of the humidified fluid introduction pipe 38, and through such openings 38a, the flow passage 38b of the humidified fluid introduction pipe 38 communicates with a region external to the hollow fiber membranes 40 (which is a region between the plurality of hollow fiber membranes 40, and lies within the area between the housing 32 and the humidified fluid introduction pipe 38). The humidified fluid introduction pipe 38 is fixed in the vicinity of the central axis of the housing 32 via air permeable fixing members 44 disposed at both ends of the housing 32. One end of the humidified fluid introduction pipe 38 (the end on the side of the inlet head 14) is open, whereas the other end thereof (the end on the side of the outlet head 16) is sealed.

A humidified fluid exhaust port 46 is provided on an outer peripheral portion (lower part) of the housing 32. The humidified fluid exhaust port 46 discharges the humidified fluid that has passed between the hollow fiber membranes 40. The humidified fluid outlet joint 48 is attached to the humidified fluid exhaust port 46.

As shown in FIG. 1, a flange-like connecting portion 46b is provided on the humidified fluid exhaust port 46, and a connecting surface 46a lying parallel to the axial direction of the housing 32 is formed at an end of the connecting portion 46b. Further, the humidified fluid outlet joint 48 is provided with a flange-like connecting portion 48b, and a connecting surface 48a thereof is formed at an end of the connecting portion 48b. A third joint connection 33 is constituted by the connecting portion 46b and the connecting portion 48b.

As shown in FIG. 3, the humidified fluid exhaust port 46 and the humidified fluid outlet joint 48 are connected in an airtight manner by bringing the connecting surface 46a and the connecting surface 48a into surface contact while sandwiching a packing 47 therebetween. As shown in FIG. 1, the connecting portion 48b and the connecting portion 46b are fastened together by bolts 58.

The connecting portion 48b of the humidified fluid outlet joint 48 is provided with insertion holes 46c into which shaft portions 58a of the bolts 58 (fifth fastening members) are inserted. The insertion holes 46c penetrate in a thickness direction of the connecting portion 48b. The insertion holes 46c are formed to be larger than the diameter of the shaft portions 58a of the bolts 58. Consequently, the humidified fluid outlet joint 48 can be displaced in the direction of the connecting surface 48a with respect to the housing 32, in a state before the bolts 58 have been completely fastened. Although the difference between the inner diameter of the insertion holes 46c and the diameter of the shaft portions 58a of the bolts 58 forms a clearance, it is preferable for the size of such a clearance to be larger than a tolerance (molding error) of the housing 32.

Figure 4:
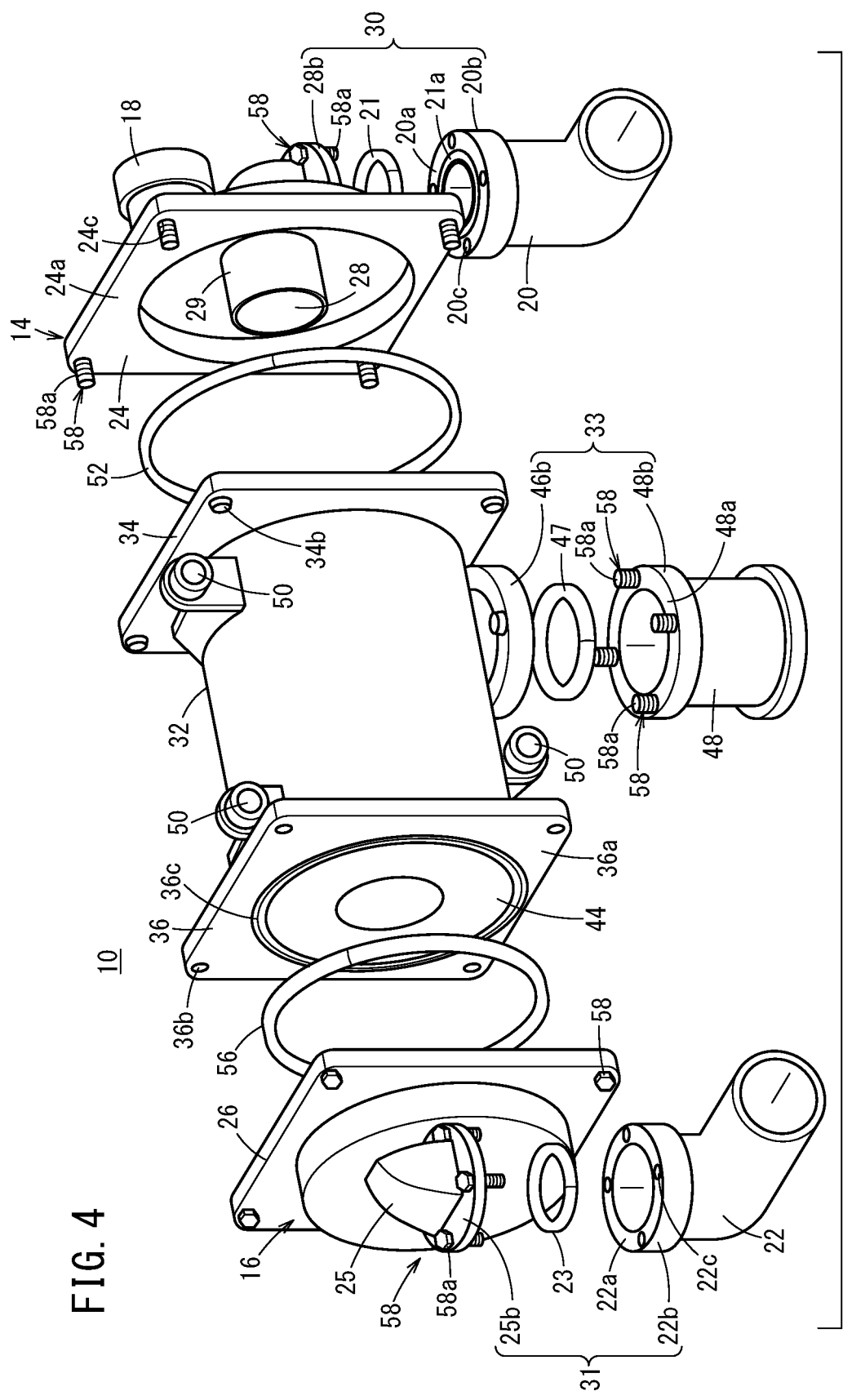
FIG. 4 is an exploded perspective view of the humidifier shown in FIG. 1.

A first flange member 34, which may be regarded as a first connecting flange, is provided over the entire periphery on one end (an end on the side of the inlet head 14) of the housing 32. The first flange member 34 is formed with an inlet head receiving surface 34a that is perpendicular to the axis of the housing 32, and which is configured for abuttingly contacting a connecting surface 24a of the inlet head, as shown. Further, the first flange member 34 is provided with bolt fixing parts 34b having threaded screw holes (connecting flange attachment holes) therein. These connecting flange attachment holes, formed in the bolt fixing parts 34b, have a diameter configured to threadably receive ends of the bolts (fasteners) 58. As shown in FIG. 4, a plurality of the bolt fixing parts 34b are arranged at intervals along the peripheral direction of the first flange member (first connecting flange) 34. A packing attachment groove 34c is formed in the connecting surface 34a of the first flange member 34, and an annular packing 52 is inserted into the packing attachment groove 34c.

As shown in FIG. 4, a second flange member 36, which may also be referred to as second connecting flange, is provided over the entire periphery on another end (an end on the side of the outlet head 16) of the housing 32. The second flange member 36 is formed with an outlet head connecting surface 36a that is perpendicular to the axis of the housing 32. Further, the second flange member 36 is provided with bolt fixing parts 36b having threaded screw holes (connecting flange attachment holes) therein. These connecting flange attachment holes, formed in the bolt fixing parts 36b, have a diameter similar to the diameter of the connecting flange attachment holes formed in the first connecting flange 34. A plurality of the bolt fixing parts 36b are arranged at intervals along the peripheral direction of the second flange member 36. A packing attachment groove 36c is formed in the connecting surface 36a of the second flange member 36, and an annular packing 56 is inserted into the packing attachment groove 36c.

The inlet head 14 includes a connecting portion 24 or main inlet flange, the fluid-to-be-humidified introduction port 18, and a humidified fluid flow passage 28. The connecting portion (main inlet flange) 24 is formed in a flange-like shape, and on an end thereof, a connecting surface 24a is formed that lies perpendicular to the axial direction of the inlet head 14. As shown in FIG. 1, the connecting surface 24*a* of the inlet head 14 is connected in an airtight manner in surface contact with the inlet head receiving surface 34*a* of the housing's first flange member 34.

Further, a plurality of fastener insertion holes 24*c* are formed in the main inlet flange 24 at portions corresponding to the positions of the bolt fixing parts 34*b* of the first flange member 34. The fastener insertion holes 24*c* penetrate in a thickness direction of the main inlet flange 24. The fastener insertion holes 24*c* are formed to have an inner diameter that is larger than connecting flange attachment holes, and which is also larger than the diameter of the shaft portions 58*a* of the bolts 58 (first fastening members) used for fastening the inlet head 14. The enlarged diameters of the fastener insertion holes 24*c* slidably receive the bolt shaft portions 58*a* such that they are movable in directions perpendicular to the bolts' longitudinal axes, and provide clearance differentials configured to permit adjustment of a connecting position of the inlet head in relation to the housing 32. Therefore, by adjusting the position at which the bolts 58 are fastened, the fixing position of the inlet head 14 can be displaced with respect to the housing 32 in the direction of the connecting surface 24*a*.

As shown in FIG. 3, the fluid-to-be-humidified introduction port 18 is formed integrally with the inlet head 14. The fluid-to-be-humidified introduction port 18 is connected to a fluid-to-be-humidified flow passage 14*a* of the inlet head 14. The fluid-to-be-humidified flow passage 14*a* communicates with the interior of the hollow fiber membranes 40 via the fixing member 44.

The inlet head 14 includes a flow passage forming cylindrical member 29 that forms the humidified fluid flow passage 28. The flow passage forming cylindrical member 29 is formed in the vicinity of the central axis of the inlet head 14. One end of the flow passage forming cylindrical member 29 is inserted into the interior of the humidified fluid introduction pipe 38 that is disposed in the humidifying module 12. The humidified fluid flow passage 28 and the humidified fluid introduction pipe 38 are connected in an airtight manner via a packing 54. The flow passage forming cylindrical member 29 extends from the inlet head 14 and is bent substantially at a right angle, and a flange-like connecting portion 28*b* is formed at the other end thereof. A connecting surface is formed on the connecting portion 28*b*. Further, an annular groove is formed in the connecting surface 28*a*, and a packing 21 is mounted in the groove.

The connecting surface 28*a* of the connecting portion 28*b* is formed in a direction perpendicular to the connecting surface 24*a* between the inlet head 14 and the housing 32. A plurality of insertion holes 28*d* through which the shaft portions 58*a* of the bolts 58 pass are formed in an outer peripheral portion of the connecting portion 28*b*. The insertion holes 28*d* are formed with a diameter that is larger than the diameter of the shaft portions 58*a* of the bolts 58. The positions at which the bolts 58 (second fastening members) are fastened can be adjusted within a range of the clearance provided by the insertion holes 28*d*.

It is preferable for the size of such a clearance to be larger than a molding error of the housing 32.

A flange-like connecting portion 20*b* is formed on one end of the humidified-fluid inlet joint 20, and a connecting surface 20*a* thereof is formed at an end of the connecting portion 20*b*. A packing attachment groove 21*a* is formed in the connecting surface 20*a*, and the packing 21 is mounted in the packing attachment groove 21*a*. By the connecting surface 20*a* being placed in surface contact with the connecting surface 28*a* with the packing 21 sandwiched therebetween, the humidified-fluid inlet joint 20 is connected in an airtight manner to the humidified fluid flow passage 28. Further, on an outer peripheral portion of the connecting portion 20*b*, screw holes 20*c* into which the bolts 58 are inserted are formed in portions corresponding to the insertion holes 28*d* of the connecting portion 28*b*. A first joint connection 30 is constituted by the aforementioned connecting portion 28*b* and the connecting portion 20*b*.

The humidified-fluid inlet joint 20 is fixed to the flow passage forming cylindrical member 29, by fastening to the screw holes 20*c* the bolts 58 that are inserted from the connecting portion 28*b*. By carrying out adjustment of the fixing position of the bolts 58, the position of the humidified-fluid inlet joint 20 is capable of being displaced in an in-plane direction of the connecting surface 20*a*.

As shown in FIG. 3, the outlet head 16 includes a connecting portion 26, a flow passage forming wall 25 that forms an outlet flow passage 25*d*, and the fluid-to-be-humidified outlet joint 22. The connecting portion 26 is formed in a flange-like shape that extends along the entire periphery of the outer peripheral portion of the outlet head 16, and on an end thereof, a connecting surface 26*a* is formed that lies perpendicular to the axial direction (X direction) of the housing 32. The outlet head 16 and the housing 32 are connected in an airtight manner, by the connecting surface 26*a* being placed in surface contact with the connecting surface 36*a* of the second flange member 36 while sandwiching the packing 56 therebetween.

Further, as shown in FIG. 1, insertion holes 26*c* are formed in the connecting portion 26 at portions corresponding to the positions of the bolt fixing parts 36*b* of the second flange member 36. The insertion holes 26*c* penetrate in a thickness direction of the connecting portion 26. The insertion holes 26*c* are formed to have an inner diameter that is larger than the diameter of the shaft portions 58*a* of the bolts 58 (third fastening members) used for fastening the outlet head 16. Therefore, the fixing position of the outlet head 16 is capable of being adjusted in an in-plane direction of the connecting surface 26*a*.

As shown in FIG. 3, the outlet flow passage 25*d* is provided in the interior of the outlet head 16. The outlet flow passage 25*d* communicates with the inner sides of the hollow fiber membranes 40 via the fixing member 44. A flange-like connecting portion 25*b* is formed on the outlet head 16. A connecting surface 25*a* is formed at an end of the connecting portion 25*b*. The connecting surface 25*a* is made up from a planar surface that lies perpendicular to the connecting surface 26*a* of the outlet head 16 with respect to the housing 32. As shown in FIG. 4, a non-illustrated groove is formed in the connecting surface 25*a*, and an annular packing 23 is mounted in such a groove.

As shown in FIG. 1, insertion holes 25*c* are formed in an outer peripheral portion of the connecting surface 25*a* of the connecting portion 25*b*. The insertion holes 25*c* penetrate in a thickness direction of the connecting portion 25*b*. The insertion holes 25*c* are formed as through holes having an inner diameter that is larger than the diameter of the shaft portions 58*a* of the bolts 58 (fourth fastening members), and the position at which the bolts 58 are fastened is capable of being adjusted.

A flange-like connecting portion 22*b* is formed on one end of the fluid-to-be-humidified outlet joint 22, and a connecting surface 22*a* thereof is formed at an end of the connecting portion 22*b*. The fluid-to-be-humidified outlet joint 22 is connected in an airtight manner to the outlet head 16, by the connecting surface 22*a* being placed in surface contact with the connecting surface 25*a* of the outlet head 16 while sandwiching the packing 23 therebetween. Further, on an outer peripheral portion of the connecting portion 22b, screw holes 22c into which the bolts 58 are inserted are formed in portions corresponding to the insertion holes 25c of the connecting portion 25b. A second joint connection 31 is constituted by the aforementioned connecting portion 22b and the connecting portion 25b.

The fluid-to-be-humidified outlet joint 22 is fixed to the connecting portion 25b of the outlet head 16, by fastening to the screw holes 22c the bolts 58 that are inserted from the side of the connecting portion 25b of the outlet head 16. By adjusting the fastening position of the bolts 58, the fixing position of the fluid-to-be-humidified outlet joint 22 is capable of being adjusted in an in-plane direction of the connecting surface 22a.

The humidifier 10 which is configured in the manner described above is manufactured by the following method.

First, the humidifying module 12 is manufactured (step S10). The housing 32 of the humidifying module 12 is manufactured by integral molding of a resin. Into such a housing 32, the hollow fiber membranes 40, the humidified fluid introduction pipe 38, and the fixing members 44 are assembled in order to manufacture the housing 32.

Next, the heads 14 and 16 and the joints 20, 22 and 48 are manufactured (step S20). Such members can be manufactured, for example, by integral molding of a resin.

Next, positioning of the heads 14 and 16 and the joints 20, 22 and 48 is carried out (step S30). Using a positioning jig, the inlet head 14, the outlet head 16, the humidified-fluid inlet joint 20, the fluid-to-be-humidified outlet joint 22, and the humidified fluid outlet joint 48 are disposed at predetermined positions on the housing 32. In the humidifier 10, the connections between the heads 14 and 16 and the joints 20, 22 and 48 are provided with clearances that are capable of being adjusted in the directions of their connection surfaces. Therefore, using the positioning jig, the heads 14 and 16 and the joints 20, 22 and 48 are positioned at predetermined positions.

Thereafter, the bolts 58 are completely tightened and fastened (step S40). Consequently, the locations where the joints 20, 22, and 48 have been positioned can be fixed in place. In accordance with the above steps, the humidifier 10 is completed.

The humidifier 10 realizes the following advantageous effects.

In accordance with the humidifier 10, clearances are provided at the connecting portions between the heads 14 and 16 and the housing 32, the connecting portions between the joints 20 and 22 and the heads 14 and 16, and the connecting portion between the joint 48 and the housing 32. In accordance with this feature, the mounting positions of the openings 20A, 22A, and 48A of the joints 20, 22, 48 with respect to the housing 32 are capable of being adjusted. Therefore, a desired degree of accuracy can be assured by carrying out the positioning operation at the time that the joints 20, 22, and 48 are assembled. As a result, even in the case that the housing 32 is produced by integral molding of a resin, there is no need to perform additional machining, and the joints 20, 22, and 48 can be assembled with high positional accuracy while reducing costs.

The aforementioned clearances are preferably larger than a molding error (tolerance) of the housing 32. In accordance with this feature, any molding errors of the housing 32 can be corrected by adjusting the clearances of the connecting portions between the heads 14 and 16 and the joints 20, 22, and 48.

The humidified fluid outlet joint 48 through which the humidified fluid is discharged from the humidifying module 12 is connected to the side of the housing 32 at the connecting surface 46a that lies parallel to the axial direction of the housing 32. In this case, a clearance may also be provided at the third joint connection 33 between the humidified fluid outlet joint 48 and the housing 32. Consequently, it is possible to adjust the connecting position of the humidified fluid outlet joint 48 in the direction of the connecting surface 46a.

The direction in which the clearances of the joint connections 30 and 31 are capable of being displaced may be orthogonal to the direction in which the clearances of the connecting portions 24 and 26 between the heads 14 and 16 and the housing 32 are capable of being displaced. In accordance with this feature, the positions of the joints 20 and 22 can be adjusted within a three-dimensional range.

The housing 32 may further include the joint connection 33 and the joint (humidified fluid outlet joint 48) connected to the joint connection 33. A clearance may be provided on the joint connection 33 which is capable of being displaced in the direction of the connecting surface 48a of the joint connection 33.

The housing 32 may be formed in a cylindrical shape, together with including the first flange member 34 which is formed at one end of the housing 32, and the second flange member 36 which is formed at the other end of the housing 32. The heads 14 and 16 may include the inlet head 14 that is connected to the first flange member 34, and the outlet head 16 that is connected to the second flange member 36. The joints may include the first and second inlet joints 18 and 20 that are connected to the inlet head 14, the fluid-to-be-humidified outlet joint 22 that is connected to the outlet head 16, and the humidified fluid outlet joint 48 that is connected to the housing 32.

The humidified-fluid inlet joint 20 may be connected to the inlet head 14 via the joint connection 30, and the fluid-to-be-humidified outlet joint 22 may be connected to the outlet head 16 via the joint connection 31. In accordance with this feature, concerning the humidified-fluid inlet joint 20 and the fluid-to-be-humidified outlet joint 22, positional adjustment thereof can be carried out in a direction that differs from that of the connecting surfaces 34a and 36a of the first and second flange members 34 and 36.

The present invention is not limited to the embodiment described above, and various modifications can be adopted within a range that does not depart from the essence and gist of the present invention.

What is claimed is:

1. A humidifier comprising:
   a humidifying module including a cylindrical housing;
   an inlet head connected to one end of the housing at an inlet head receiving surface which is perpendicular to an axis of the housing, the inlet head including a main inlet flange having a plurality of fastener insertion holes formed therein and configured to receive fastener shafts therethrough, each of the fastener insertion holes of the main inlet flange having a first diameter,
   the housing having a first connecting flange for abuttingly contacting the main inlet flange of the inlet head, the first connecting flange having a plurality of connecting flange attachment holes formed therein;
   an outlet head connected to another end of the housing at an outlet head receiving surface perpendicular to the axis of the housing, the outlet head including a main outlet flange having a plurality of fastener insertion holes formed therein and configured to receive fastener shafts therethrough;

the housing further having a second connecting flange thereon, the second connecting flange having a plurality of connecting flange attachment holes formed therein;

a humidified-fluid inlet joint connected to the inlet head via a first joint connection having a first joint connecting surface orthogonal to the inlet head receiving surface between the housing and the inlet head, the humidified-fluid inlet joint having a plurality of fastener insertion holes formed therein;

a fluid-to-be-humidified outlet joint connected to the outlet head via a second joint connecting having a second joint connecting surface orthogonal to the outlet head receiving surface between the housing and the outlet head, the fluid-to-be-humidified outlet joint having a plurality of fastener insertion holes formed therein; and a plurality of fastening members for respectively fixing a connection between the housing and the inlet head, a connection between the housing and the outlet head, and the first and second joint connections, each of the fastening members including a fastener shaft having a shaft diameter which is smaller than the first diameter;

wherein, on the connection between the housing and the inlet head, the connection between the housing and the outlet head, a connection between the inlet head and the humidified-fluid inlet joint, and a connection between the outlet head and the fluid-to-be-humidified outlet joint, size differences between the shaft diameter of each of the fastening members and the diameter of a corresponding fastener insertion hole which receives the shaft provide clearance differentials configured to permit adjustment of connecting positions of the inlet head, the outlet head and the inlet and outlet joints, respectively, in directions of the connecting surfaces of the connections.

2. The humidifier according to claim 1, wherein the clearance differentials are larger than a molding error of the housing.

3. The humidifier according to claim 1, wherein a humidified-fluid outlet joint, adapted to discharge humidified fluid from the humidifying module, is connected to a side of the housing with a connecting surface that lies parallel to the axis of the housing.

4. The humidifier according to claim 3, wherein a first direction, in which clearances of the first and second joint connections are capable of being displaced, is orthogonal to a second direction in which clearances between the inlet head and the outlet head and the housing are capable of being displaced.

5. The humidifier according to claim 1, wherein a fluid-to-be-humidified introduction port is provided on the inlet head.

* * * * *